United States Patent
Shimura et al.

(10) Patent No.: US 8,772,433 B2
(45) Date of Patent: Jul. 8, 2014

(54) POLYACTIC ACID-BASED POLYOL COMPOSITION, PROCESS FOR PRODUCTION THEREOF, URETHANE RESIN COMPOSITION, PROCESS FOR PRODUCTION OF SAME, AND MOLDED PRODUCTS THEREOF

(75) Inventors: Midori Shimura, Tokyo (JP); Kazuhiko Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/515,189

(22) PCT Filed: Oct. 25, 2010

(86) PCT No.: PCT/JP2010/068852
§ 371 (c)(1),
(2), (4) Date: Jun. 11, 2012

(87) PCT Pub. No.: WO2011/074328
PCT Pub. Date: Jun. 23, 2011

(65) Prior Publication Data
US 2012/0264905 A1    Oct. 18, 2012

(30) Foreign Application Priority Data
Dec. 14, 2009 (JP) ................. 2009-283476

(51) Int. Cl.
| | | |
|---|---|---|
| C07C 69/68 | (2006.01) | |
| C08G 18/24 | (2006.01) | |
| C08G 18/34 | (2006.01) | |
| C08G 63/08 | (2006.01) | |
| C08G 18/79 | (2006.01) | |
| C08G 63/91 | (2006.01) | |
| C08G 18/42 | (2006.01) | |
| C08K 3/36 | (2006.01) | |

(52) U.S. Cl.
CPC .............. C08G 18/428 (2013.01); C08K 3/36 (2013.01); C08G 63/08 (2013.01); C08G 18/791 (2013.01); C08G 63/912 (2013.01)
USPC ............................... 528/58; 528/48; 560/182

(58) Field of Classification Search
CPC ........ C07C 69/68; C08G 18/24; C08G 18/34
See application file for complete search history.

(56) References Cited

U.S. PATENT DOCUMENTS

| 4,507,410 A | 3/1985 | Falardeau et al. |
| 2009/0292035 A1* | 11/2009 | Semmes ....................... 521/141 |
| 2010/0016628 A1* | 1/2010 | Uyama et al. ................. 560/182 |
| 2010/0240841 A1 | 9/2010 | Shimura et al. |

FOREIGN PATENT DOCUMENTS

| CN | 1817939 A | 8/2006 |
| JP | 2001-98044 A | 4/2001 |
| JP | 2002-167497 A | 6/2002 |
| JP | 2003-137993 A | 5/2003 |
| JP | 2005-187528 A | 7/2005 |
| JP | 2007-29829 A | 2/2007 |
| JP | 2009-96881 A | 5/2009 |
| JP | WO 2009/063943 A1 | 5/2009 |
| JP | 2009-249518 A | 10/2009 |
| JP | 2010-150411 A | 7/2010 |

OTHER PUBLICATIONS

English translation JP 2001-098044, Apr. 2001.*

* cited by examiner

*Primary Examiner* — Randy Gulakowski
*Assistant Examiner* — Jeffrey Washville
(74) *Attorney, Agent, or Firm* — Foley & Lardner LLP

(57) ABSTRACT

Provided is a polylactic acid-based polyol composition in which a catalyst that remains in the polylactic acid-based polyol and that acts also as a catalyst for urethane formation has been deactivated by easy means. Thus, the polylactic acid-based polyol composition suffers from little influence of the catalyst on urethane formation. When the polylactic acid-based polyol composition is used as a raw material for a urethane resin, therefore, uniform molded products can be obtained. Also provided are a process for the production of the polylactic acid-based polyol composition, a urethane resin composition obtained using the polylactic acid-based polyol composition, a process for the production of the same, and molded products thereof. The polylactic acid-based polyol composition is a composition which comprises both a polylactic acid-based polyol prepared by transesterification and a silica compound and in which the silica compound has a surface area of 40 m² or more based on 100 g of the polylactic acid-based polyol and a content of the silica compound is 70 wt % or less.

12 Claims, No Drawings

POLYACTIC ACID-BASED POLYOL COMPOSITION, PROCESS FOR PRODUCTION THEREOF, URETHANE RESIN COMPOSITION, PROCESS FOR PRODUCTION OF SAME, AND MOLDED PRODUCTS THEREOF

This application is the National Phase of PCT/JP2010/068852, filed Oct. 25, 2010, which claims priority to Japanese Application No. 2009-283476, filed Dec. 14, 2009, the disclosures of which are hereby incorporated by reference in their entirety.

TECHNICAL FIELD

The present invention relates to a polylactic acid-based polyol composition in which a catalyst that remains in the polylactic acid-based polyol obtained by transesterification has been deactivated, a process for production thereof, a urethane resin composition obtained using the same, a process for production thereof, and molded products thereof.

BACKGROUND ART

Traditionally, polyurethanes have been used in a wide range of fields such as plastic materials, fibers, paints or adhesives. Recently, polyurethanes in which a biodegradable and biocompatible polylactic acid-based polyol is used as a raw material are drawing attention in view of environmental issues. Also, polyurethanes using a polylactic acid-based polyol having shape-memory property as a raw material are known (Patent Document 1), and they are investigated for applications in electronic or medical materials. Polylactic acid-based polyols used in manufacturing urethane resins are obtained by ring-opening polymerization of lactides in which compounds having two or more hydroxyl groups are used as an initiator, or by transesterification between a compound having two or more hydroxyl groups and a commercially available polylactic acid resin. When a polylactic acid-based polyol is produced by lactide ring-opening polymerization, lactides are needed for purification because low purity lactides cannot produce high molecular weight polymers. In addition, lactides are expensive. Transesterification has higher productivity than ring-opening polymerization because it can produce polylactic acid-based polyols only by mixing raw materials in solution.

However, polylactic acid-based polyols obtained by transesterification contain oligomers of byproducts from transesterification, and a polymerization catalyst used in synthesizing a polylactic acid-based compound supplied as a raw material for transesterification. These impurities which remain in the polylactic acid-based polyol affect urethane reaction, and thus a purification process is needed. Methods for purification include a reprecipitation method in which a polylactic acid-based polyol is dissolved in a solvent such as chloroform and the resulting solution is added to a poor solvent such as methanol to precipitate impurities, and a reduced pressure method in which oligomers are removed by forming a reduced pressure in a system after an esterification reaction is completed. The reprecipitation method can remove a catalyst as well as oligomers. However, this method has high environmental load and low productivity due to the use of enormous solvents. The reduced pressure method reduces pressure using an apparatus such as a distiller attached to a reactor. Therefore, this method is an easy method for purification having high productivity.

The reduced pressure method can remove oligomers having a low boiling point. However, in this method, polymerization catalysts having a high boiling point remain in polylactic acid-based polyols. Polymerization catalysts also have a catalytic function in a urethanization reaction of polylactic acid-based polyols. For this reason, when synthesizing polyurethanes using polylactic acid-based polyols purified by the reduced pressure method, the urethanization reaction proceeds by the remaining polymerization catalyst. In this case, components supplied for urethanization may not be homogeneously blended, and consequently it is difficult to obtain a uniform molded product. Therefore, as deactivators to form a chelator with a polymerization catalyst in a polylactic acid and deactivate the catalyst, phosphoric acids, citric acids, phenolic compounds, multifunctional amine compounds and the like are known in the art (Patent Documents 2 and 3). However, since these deactivators are acidic or alkaline compounds, they have a problem in that polylactic acids may be degraded or urethanization may be inhibited due to a reaction with isocyanate groups. In particular, acids are reacted with isocyanates to produce carbon dioxides, and consequently a uniform molded product may not be obtained. Additionally, a method of deactivating the remaining catalyst by a hot water treatment was reported (Patent Document 4). However, in this method, water also may cause the degradation of polylactic acids or the formation of bubbles in the same way as acids.

Further, silica compounds are known in the art as a catalyst-adsorbing material (Patent Document 5). In Patent Document 5, a tin catalyst used in the synthesis of a polymer is reacted with silanol groups on the surface of a silica compound to synthesize a solid catalyst previously, and the resulting catalyst is used as a catalyst for urethanization. Herein, since the adsorbed tin catalyst acts as a catalyst, said method is not intended to deactivate a catalytic function. Also, according to Examples of this Patent Document, it takes 3 hours to heat the silica compound and the tin catalyst in synthesizing the solid catalyst. It is difficult to apply such a method for synthesizing a solid catalyst to a polylactic acid-based polyol obtained by transesterification under the same reaction condition due to the risk of degrading a resin. In addition, a tin catalyst adsorbed on the surface of a silica compound has a decreased dispersion in a urethane ingredient, and consequently it is difficult to obtain a uniform molded product.

CITATION LIST

Patent Document

Patent Document 1: JP Patent Application Publication No. 2007-29829
Patent Document 2: JP Patent Application Publication No. 2002-167497
Patent Document 3: JP Patent Application Publication No. 2009-249518
Patent Document 4: JP Patent Application Publication No. 2003-137993
Patent Document 5: U.S. Pat. No. 4,507,410

SUMMARY OF INVENTION

Technical Problem

An object of the present invention is to provide a polylactic acid-based polyol composition in which a catalyst that remains in the polylactic acid-based polyol and that acts also as a catalyst for urethane formation is deactivated by easy means, the effect of said catalyst during urethane formation is inhibited, and a uniform molded product can be obtained when it is used as a raw material for a urethane resin, and a process for the production thereof. Another object of the present invention is to provide a urethane resin composition obtained by using said polylactic acid-based polyol composition, a process for the production thereof, and a molded product thereof.

Solution to Problem

The present inventors have assiduously studied, and as a result, the inventors founded that a catalytic function of a polymerization catalyst used in the synthesis of a polylactic acid-based compound which remains in the polylactic acid-based compound supplied as a raw material for transesterification can be deactivated by adding and mixing a silica compound having a particular surface area to a polylactic acid-based polyol obtained by said transesterification. Further, the inventors founded that a uniform urethane resin can be obtained by reacting a polylactic acid-based polyol composition thus obtained with a polyisocyanate compound, and ultimately a uniform molded product can be obtained. The present invention has been completed based on these findings.

That is, the present invention relates to a polylactic acid-based polyol composition characterized by comprising a polylactic acid-based polyol obtained by transesterification and a silica compound, wherein the silica compound has a surface area of 40 $m^2$ or more based on 100 g of said polylactic acid-based polyol, and a content of the silica compound is 70 wt % or less.

Further, the present invention relates to a urethane resin composition characterized by comprising a urethane ingredient including said polylactic acid-based polyol composition and a polyisocyanate compound.

Further, the present invention relates to a process for the production of a polylactic acid-based polyol composition characterized by adding a silica compound to a crude polylactic acid-based polyol obtained by transesterification between a polylactic acid-based compound synthesized by using a catalyst and a polyol, wherein the silica compound has a surface area of 40 $m^2$ or more based on 100 g of said crude polylactic acid-based polyol, and is added at a content in the range of 70 wt % or less.

Further, the present invention relates to a process for the production of a urethane resin composition characterized by adding a catalyst when adding a polyisocyanate compound to said polylactic acid-based polyol composition, or a molded product molded using said urethane resin composition.

Effect of the Invention

The polylactic acid-based polyol composition according to the present invention can be simply obtained by adding a silica compound having a particular surface area to a polylactic acid-based polyol obtained by transesterification, wherein a catalytic function in urethane formation of a polymerization catalyst which is used in the synthesis of a polylactic acid-based compound and remains in the polylactic acid-based polyol is deactivated. When using said polylactic acid-based polyol composition as a raw material in the synthesis of polyurethane, an effect in urethane formation of the polymerization catalyst is inhibited so that a uniform molded product can be obtained. Further, since the silica compound does not degrade the polylactic acid-based polyol, a urethane resin obtained by using said polylactic acid-based polyol composition has excellent physical properties, and it may be used in a wide range of fields such as electronic, medical, packaging, fiber, paint, adhesive or industrial materials.

DESCRIPTION OF EMBODIMENTS

The polylactic acid-based polyol composition according to the present invention is characterized by comprising a polylactic acid-based polyol obtained by transesterification and a silica compound, wherein the silica compound has a surface area of 40 $m^2$ or more based on 100 g of said polylactic acid-based polyol, and a content of the silica compound is 70 wt % or less.

[Polylactic Acid-based Polyol]

The polylactic acid-based polyol contained in the polylactic acid-based polyol composition according to the present invention includes a polylactic acid-based polyol which is obtained by transesterification between a polylactic acid-based compound synthesized by using a polymerization catalyst and a polyol. The polylactic acid-based compound may include polymer of L-lactic acid, polymer of D-lactic acid, copolymer thereof (poly DL-lactic acids), or copolymer of L-lactic acid and/or D-lactic acid and other monomers capable of forming esters with such lactic acids. Examples of such monomers may include glycolic acids, hydroxybutyric acids, hydroxyvaleric acids, hydroxypentanoic acids, or hydroxycarboxylic acids such as hydroxycaproic acid. Also, polylactic acid-based compounds may be produced by ring-opening copolymerization of lactides or cyclic compounds between lactides and said hydroxycarboxylic acids.

These polylactic acid-based compounds may be polycondensation products synthesized by using monomers, oligomers or polymers obtained from biomass, or derivatives or analogues thereof, as a raw material along with a polymerization catalyst, or may be products synthesized by using compounds other than biomass, as well as natural extracts or derivatives or analogues thereof, as a raw material along with a polymerization catalyst. It is particularly preferred that these polylactic acid-based compounds have good biodegradability to reduce environmental load when discarding them.

The polymerization catalyst for said lactic acid-based compounds is not particularly limited, but may include tin or tin compounds. Examples may include tin-based compounds such as tin octylate, tin lactate, tin tartrate, tin dicaprylate, tin dilaurylate, tin dipalmitate, tin distearate, tin dioleate, tin α-naphthoate and tin β-naphthoate, tin powers, or tin oxides. Tin octylate is particularly preferred since it has high stability and activity. The content of tin which remains in the resulting polylactic acid-based compound may be about 30 ppm. Further examples may include zinc powder, zinc halide, zinc oxide, organic zinc-based compound, titanium-based compound such as tetrapropyltitanate, zirconium-based compound such as zirconium isopropoxy, antimony-based compound such as antimony trioxide, bismuth-based compound such as bismuth (III) oxide, or aluminum-based compound such as aluminum oxide or aluminum isopropoxide.

The polyol which can be subjected to transesterification with said polylactic acid-based compound is not particularly limited. Specifically, such polyol may include dihydric alcohol such as ethylene glycol, propylene glycol, dipropylene glycol, 1,3-butanediol, 1,4-butanediol or 1,6-hexanediol; trihydric alcohol such as glycerin, trimethylolpropane, trimethylolethane and hexanetriol; tetrahydric alcohol such as pentaerythritol, methylglicoside or diglycerin; polyglycerin such as triglycerin or tetraglycerin; polypentaerythritol such as dipentaerythritol or tripentaerythritol; cycloalkanepolyol such as tetrakis(hydroxymethyl)cyclohexanol; or polyvinylalcohol. Further, examples may also include sugar alcohol such as adonitol, arabitol, xylitol, sorbitol, manitol, iditol, talitol or dulcitol; or saccharide such as glucose, mannoseglucose, mannose, fructose, sorbose, sucrose, lactose, lapinose or cellulose. Multihydric phenol may include monocyclic multihydric phenol such as pyrogallol, hydroquinone or fluoroglucin, bisphenol such as bisphenol A or bisphenol sulfone, or polycondensation product (Novolac) between phenol and formaldehyde. The polyol may be used in any combination of one or two or more polyols.

The transesterification between the polylactic acid-based compound and the polyol may be performed without a catalyst. In this case, the catalyst containing elements such as Ti, Sn, Zn, Mg, Al or the like may be used, and specifically tetraisopropoxide titanium or tetrabutoxide titanium may be used. For example, the amount of the catalyst used may be 10 ppm to 1000 ppm based on the total weight of polylactic acid-based compound and polyol used as raw materials for the transesterification.

The number average molecular weight of polylactic acid-based polyol obtained by said transesterification may be in the range of 100 to 1,000,000, preferably 500 to 20,000, and more preferably 1,000 to 10,000. If the number average molecular weight of a polylactic acid-based polyol is not less than 100, a polyurethane molded product obtained by cross-linking with polyisocyanate has excellent mechanical properties. If the number average molecular weight is not more than 1,000,000, an increase in viscosity is inhibited to facilitate handling, and a cross-linking density is increased to obtain a molded product having good physical properties such as thermal resistance or shape memory property.

As a reaction byproduct, oligomers of polylactic acid-based compound are contained in a crude polylactic acid-based polyol obtained by said transesterification. When a polylactic acid-based polyol containing oligomers is used for polyurethane formation, the generation of gases, a decrease in the strength of a urethane resin, the degradation of polylactic acid, or the like may occur. Therefore, it is preferred that oligomers are removed from the crude polylactic acid-based polyol. These oligomers may preferably be removed from the polylactic acid-based polyol by a reduced pressure method, and specifically a method of reducing pressure using a distiller attached to a reactor may be used.

Carboxylic acids in the crude polylactic acid-based polyol obtained by said transesterification may cause the generation of gases due to a reaction with isocyanates, a decrease in the strength of a urethane resin, the degradation of polylactic acids, or the like. Therefore, it is preferred that the concentration of carboxylic acids is low. The concentration of carboxylic acids in the polylactic acid-based polyol is preferably 500 µmol/g or less, more preferably 300 µmol/g or less, and even more preferably 100 µmol/g or less. If the concentration is 500 µmol/g or less, the above-mentioned side reaction is inhibited. The concentration of carboxylic acids may be determined by dissolving polylactic acid-based polyol in a solution of chloroform and methanol, adding an indicator such as phenol red thereto, and titrating with a solution of sodium hydroxide in water.

Carboxylic acids in the crude polylactic acid-based polyol are greatly contained in oligomers. Therefore, the concentration of carboxylic acids in the crude polylactic acid-based polyol may be decreased by removing oligomers contained in the crude polylactic acid-based polyol using a reduced pressure method. Also, the concentration of carboxylic acids may be decreased by adding a carboxylic acid-capturing agent to the crude polylactic acid-based polyol. The carboxylic acid-capturing agent known in the art may be used, and examples may include monocarbodiimide compound having one functional group and polycarbodiimide compound having two or more functional groups. In addition, compound such as oxazoline, oxadine or epoxy compound may also be used instead of carbodiimide.

Monocarbodiimide is a compound having one carbodiimide group in one molecule. Specifically, examples may include aromatic monocarbodiimide such as diphenylcarbodiimide, di-2,6-dimethylphenylcarbodiimide, di-2,6-diethylphenylcarbodiimide, di-2,6-diisopropylphenylcarbodiimide, di-2,6-di-tert-butylphenylcarbodiimide, di-o-tolylcarbodiimide, di-p-tolylcarbodiimide, di-2,4,6-trimethylphenylcarbodiimide, di-2,4,6-triisopropylphenylcarbodiimide or di-2,4,6-triisobutylphenylcarbodiimide; cycloaliphatic monocarbodiimide such as di-cyclohexylcarbodiimide; or aliphatic monocarbodiimides such as di-isopropylcarbodiimide or di-octadecylcarbodiimide. These compounds may be used in any combination of one or two or more compounds. In view of good reactivity with carboxylic groups, among these, aromatic monocarbodiimide is preferably used, and di-2,6-diisopropylphenylcarbodiimide or di-2,6-dimethylphenylcarbodiimide is more preferably use.

Polycarbodiimide is a compound having two or more carbodiimide groups in one molecule, and it may be obtained by condensing diisocyanate using a catalyst such as 3-methyl-1-phenyl-2-phosphorene-1-oxide. Diisocyanate used as a raw material may include aromatic diisocyanate compound, aliphatic diisocyanate compound, cycloaliphatic diisocyanate compound, or any mixture thereof. Specifically, examples may include 1,5-naphthylenediisocyanate, 4,4'-diphenylmethanediisocyanate, 4,4'-diphenyldimethylmethanediisocyanate, 1,3-phenylenediisocyanate, 1,4-phenylenediisocyanate, 2,4-tolylenediisocyanate, 2,6-tolylenediisocyanate, the mixture of 2,4-tolylenediisocyanate and 2,6-tolylenediisocyanate, hexamethylenediisocyanate, cyclohexane-1,4-diisocyanate, xylenediisocyanate, isoporonediisocyanate, dicyclohexylmethane-4,4'-diisocyanate (hereinafter, it is referred to as HMDI), methylcyclohexanediisocyanate, tetramethylxylenediisocyanate (hereinafter, it is referred to as TMXDI), 3,3',5,5'-tetraisopropylbiphenyldiisocyanate, or the like. These compounds may be used in any combination of one or two or more compounds.

Specific examples of commercially available polycarbodiimide compound may include CARBODILITE LA-1 (manufactured by Nisshinbo Chemical Inc., aliphatic), CARBODILITE V-05 (manufactured by Nisshinbo Chemical Inc., aromatic), CARBODILITE V-02B (manufactured by Nisshinbo Chemical Inc., end-blocked isocyanate), STABAXOL P (manufactured by Rhein Chemie, aromatic), or the like.

It is preferred that the carboxylic acid-capturing agent is added at an amount such that the molar ratio of functional groups in the carboxylic acid-capturing agent to carboxylic acid is 0.9 or more in order to bind approximately the functional groups to carboxylic acid. The molar ratio is more preferably 1.0 or more, and even more preferably not less than 1.1.

[Silica Compound]

A silica compound contained in the polylactic acid-based polyol composition according to the present invention is used to adsorb and deactivate a catalyst such as a polymerization catalyst, for example tin catalyst contained in the crude polylactic acid-based polyol, which is used for synthesizing a polylactic acid-based compound used as a raw material and remains in the polylactic acid-based compound. As the silica compound, natural silica compound or synthetic silica compound may be used. Specifically, the natural silica compounds may include amorphous silica such as diatomaceous earth or acid clay, or crystalline silica such as quartz, crystal or quartz sand. These silica compounds may be used in any combination of one or two or more silica compounds. Among these, it is preferred to use amorphous silica compound having no crystalline structure since it has high safety in human body. The synthetic silica compounds may include dry silica, wet silica, silica gel, aerosil, zeolite, or the like, and these may be used in any combination of one or two or more silica compounds. These synthetic silica compounds may be manufactured by either a wet or dry method. In view of facilitating a coherent structure, it is preferred to use silica compound manufactured by the wet method.

The silica compound is added at an amount such that a surface area of the silica compound is 40 m² or more, preferably 80 m² or more, more preferably 100 m² or more, and even more preferably 200 m² or more, based on 100 g of the crude polylactic acid-based polyol. If the surface area of the silica compound is 40 m² or more based on 100 g of the crude polylactic acid-based polyol, a polymerization catalyst used for synthesizing a polylactic acid-based compound is sufficiently adsorbed to deactivate a catalytic function of the catalyst during urethane formation by using the polylactic acid-based polyol, and a lowering in the properties of a product molded by using it may be inhibited. Also, the surface area of the silica compound is 233000 m² or less, preferably 100000 m² or less, more preferably 70000 m² or less, and even more preferably 30000 m² or less, based on 100 g of the crude polylactic acid-based polyol. If the surface area of the silica compound is 233000 m² or less based on 100 g of the crude polylactic acid-based polyol, a difficulty in handling due to the increased viscosity of resin may be inhibited. The surface area of the silica compound may be determined by multiplying the content (g) of the silica compound per 100 g of the crude polylactic acid-based polyol by the specific surface area of the silica compound. The specific surface area of the silica compound is preferably 10 m²/g to 1000 m²/g, more preferably 40 m²/g to 800 m²/g, and even more preferably 200 m²/g to 500 m²/g. If the specific surface area is 10 m²/g or more, a polymerization catalyst used for synthesizing a polylactic acid-based compound may be adsorbed using a small amount of the silica compound. If the specific surface area is 1000 m²/g or less, an increase in the viscosity of a resin may be inhibited. The specific surface area of the silica compound may be measured using a specific surface area meter, and may be calculated by a BET method.

The content of the silica compound in the polylactic acid-based polyol composition is 70 wt % or less, preferably 50 wt % or less, more preferably 30 wt % or less, and even more preferably 10 wt % or less, based on the total weight of the polylactic acid-based polyol and the silica compound. If the content of the silica compound is 70 wt % or less, an increase in the viscosity of the polylactic acid-based polyol composition may be inhibited. Further, the fragility of a molded product obtained by using the polylactic acid-based polyol composition may be suppressed, and the modulus of the molded product is increased to help maintain shape memory property thereof. The content of the silica compound in the polylactic acid-based polyol composition is preferably 0.1 wt % or more, more preferably 1 wt % or more, and even more preferably 2 wt % or more. If the content of the silica compound is 0.1 wt % or more, a polymerization catalyst used for synthesizing a polylactic acid-based compound used as a raw material in the synthesis of the polylactic acid-based polyol may be effectively adsorbed in a short time.

The average primary particle size of the silica compound is preferably 30 μm or less, more preferably 10 μm or less, and even more preferably 5 μm or less, and especially preferably 3 μm or less. If the average primary particle size of the silica compound is 30 μm or less, the silica compound has a large specific surface area, and a small amount of the silica compound may adsorb a polymerization catalyst contained in the crude polylactic acid-based polyol. The silica compound having the primary particle size in said range preferably forms hard aggregates of secondary particles in the polylactic acid-based polyol composition. As the specific surface area of the silica compound is larger, the viscosity of the polylactic acid-based polyol composition is increased. However, if hard aggregates of secondary particles are formed, an increase in the viscosity of the polylactic acid-based polyol composition may be inhibited. The average particle size of secondary particle aggregates is preferably not less than 0.05 μm and not more than 30 μm, more preferably not less than 0.1 μm and not more than 10 μm, even more preferably not less than 0.5 μm and not more than 5 μm, and especially preferably not less than 0.1 μm and not more than 3 μm. The average primary particle size of the silica compound may be determined by measuring particle sizes using an electron microscope, a laser diffraction type particle size distribution meter, or a Coulter counter.

As these silica compounds, porous silica compounds including nano-porous silica, meso-porous silica, macro-porous silica, xerogel or silica aerogel may preferably be used. Specifically, NIPGEL (Tosoh Silica Corporation), SYLYSIA (Fuji Silysia Chemical Ltd.), etc. are commercially available.

These silica compound has preferably hydrophilic nature on their surface. Such hydrophilicity improves the compatibility of the silica compound with polylactic acid-based polyol, resulting in obtaining a polylactic acid-based polyol composition in which the silica compound are highly dispersed. Also, a small amount of the silica compound may adsorb effectively a tin catalyst, and the resulting urethane resin may maintain its transparency. Such the silica compound has inherently hydrophilicity, and may be subjected to a surface treatment with hydrophilic compounds.

In addition, to inhibit the degradation of the polylactic acid-based polyol, the silica compound has preferably a pH value between 3.5 and 9, and more preferably 4 to 8. The pH value may be determined by measuring pH of an aqueous solution of the silica compound using a pH meter.

The polylactic acid-based polyol composition preferably contains a polyol having glass transition temperature (Tg) of less than 30° C. in addition to the above-mentioned materials. The polyol (sometimes it is also referred to as soft polyol) having glass transition temperature (Tg) of less than 30° C. lowers the viscosity of the polylactic acid-based polyol composition, improves workability, and increases the toughness and impact resistance of the resulting urethane resin. More preferably, such the soft polyol has Tg of less than 10° C., even more preferably 0° C. or less, and especially preferably −20° C. or less.

The soft polyol may be a polycondensation product synthesized using monomer, oligomer or polymer obtained from biomass, or derivative or analogue thereof, or may be a product synthesized using raw materials other than biomass, as well as natural extract or derivative or analogue thereof. It is preferred that the soft polyol has biodegradability to reduce environmental load when discarding it. Specifically, examples may include polyester produced by a reaction of diol and dicarboxylic acid such as polybutylenesuccinate, polybutyleneadipate, polyethylenesuccinate or polyethyleneadipate; castor oil; hardened castor oil; castor oil modified polyols; or the like. These soft polyols may be used in any combination of one or two or more polyols. When the soft polyol is polyesters synthesized from dicarboxylic acid and diol, and the molar ratio of the diol to the dicarboxylic acid used for synthesizing the polyester, that is, a diol/dicarboxylic acid ratio is greater than 1, the soft polyol may have all hydroxyl groups at its ends. Also, the soft polyol may be obtained by introducing hydroxyl groups to their ends using transesterification between a polyol and a compound having two or more hydroxyl groups, or the soft polyol having the increased hydroxyl functional groups may be obtained by a reaction with a polyisocyanate or an epoxy compound having three or more functionality.

The number average molecular weight of the soft polyol may be in the range of 100 to 1,000,000, preferably 500 to 100,000, and more preferably 1,000 to 20,000. If the number average molecular weight of the soft polyol is 100 or more, polyurethane having good mechanical property and workability may be obtained. If the number average molecular weight is 1,000,000 or less, a decrease in the cross-linking density of a molded product and hence the lowering of properties such as strength may be inhibited. The amount of the soft polyol may preferably be added at an amount such that the weight ratio of the polylactic acid-based polyol to the soft polyol is 100:0 to 50:50, more preferably 95:5 to 60:40, and even more preferably 90:10 to 70:30. If the weight ratio of the polylactic acid-based polyol to the soft polyol is in said range, a molded product having high strength may be obtained. In addition, a decrease in the transparency due to crystallization may be inhibited even when the soft polyol is a crystalline polyol.

To produce said polylactic acid-based polyol composition, it is simply achieved by adding and mixing the silica compound to the crude polylactic acid-based polyol which is obtained by transesterification between the polylactic acid-based compound synthesized by using the catalyst and the polyol, wherein the silica compound has a surface area of 40 $m^2$ or more based on 100 g of said crude polylactic acid-based polyol and a content of the silica compound is 70 wt % or less. It is preferred that the silica compound is added to the dissolved polylactic acid-based polyol. A temperature for mixing is preferably 130° C. to 230° C. to inhibit the degradation of the polylactic acid-based polyol and blend effectively these materials. A time for mixing is preferably 1 min to 1 hour or less, more preferably 3 min to 30 min or less, and even more preferably 5 min to 10 min or less. If the time for mixing is within 1 hour, the degradation of the polylactic acid-based polyol or the production of the carboxylic acid may be inhibited, resulting in enabling an effective production. It is preferred that the silica compound is mixed after removing oligomers from the crude polylactic acid-based polyol after transesterification. Also, it is preferred that these oligomers are removed using a reduced pressure method in view of productivity. As such a reduced pressure method, a method of reducing pressure by 15 mmHg or less using a distiller attached to a reactor may be used.

[Urethane Resin Composition]

The urethane resin composition according to the present invention is characterized by comprising a urethane ingredient including said polylactic acid-based polyol composition and a polyisocyanate compound. The polyisocyanate compound, which is contained in the urethane ingredient along with said polylactic acid-based polyol composition and reacts with the polylactic acid-based polyol, has at least two isocyanate groups. Specific examples may include carbodiimide-modified MDI, hexamethylene diisocyanate, trimethylhexamethylene diisocyanate, tolylene diisocyanate, naphthalene diisocyanate, lysine diisocyanate, lysine triisocyanate, or the like. Among these, it is preferred to use lysine diisocyanate or lysine triisocyanate since they are natural linkers which can be derived from amino acids. It is preferred that the polyisocyanate is used at an amount such that the molar ratio of hydroxyl groups in the polylactic acid-based polyol and its isocyanate groups is in the range of 0.9 to 1.1:1, so that the strength of a molded product is increased.

Said urethane resin composition preferably contains a catalyst for urethane formation. The catalyst adjusts the gellation time of urethane ingredient and the rate of urethane formation to obtain a uniform molded product. The gellation time is from the time when the polylactic acid-based polyol composition and the polyisocyanate compound are mixed with the catalyst to the time when this urethane ingredient forms a gel. If the gellation time is significantly short, the viscosity of urethane ingredient is increased and cross-linked to preclude the formation of a molded product. If the gellation time is significantly long, it takes a long time to complete molding, resulting in lowering productivity. The optimal gellation time is varied depending on a molding method used. For example, the optimal gellation time for transfer molding is preferably 60 sec to 600 sec, and more preferably 90 sec to 300 sec. The catalyst for urethane formation preferable can adjusts gellation time and cannot be adsorbed on the silica compound contained in the polylactic acid-based polyol composition. Specific examples may include organic metal catalyst such as dibutyltin dilaurate, dioctyltin dilaurate, dibutyltin diacetate, dibutyltin maleate, bis(neodecanoate)tin, di-n-butyl bis(2-ethylhexylmaleate)tin, n-butyl bis(2,4-pentanedionate)tin, di-n-butylbutoxychlorotin, dimethylhydroxy(oleate)tin, tin dimethyldineodecanoate or di-n-butyldiacetoxy tin; inorganic metal catalyst such as tin chloride, iron chloride or bismuth nitrate; or amine catalysts such as triethylamine, triethyldiamine or dimethylethanolamine. Among these, it is preferred to use quaternary tin catalysts such as dibutyltin dilaurate having high stability since they may not be easily adsorbed on the silica compound. The amount of catalyst added is varied with the respective catalytic activity, and the amount is preferably not less than 1 wtppm and not more than 1 wt % based on the total weight of the polylactic acid-based polyol and the polyisocyanate compound. If the amount of catalyst added for urethane formation is 1 wtppm or more, the reactivity of hydroxyl groups at the ends of the polylactic acid-based polyol is improved. If the amount is 1 wt % or less, a molded product can be formed.

It is preferred that the catalyst for urethane formation is added simultaneously with adding the polyisocyanate compound to the polylactic acid-based polyol composition, because the adsorption of these catalysts on the silica compound may be inhibited. A master batch in which the polylactic acid-based polyol and the catalyst for urethane formation are mixed is previously prepared, and the master batch is added to the isocyanate compound to improve work effectiveness.

In addition, additives such as inorganic filler, organic filler, supplement, coloring agent, stabilizer (radical-capturing agent, antioxidant, etc.), antibacterial agent, antifungal agent or retardant may be contained in the urethane ingredient as necessary unless these additive impairs the properties of the urethane ingredient. As the inorganic filler, talc, sand, slag or the like may be used. As the organic filler, organic fibers such as polyamide fiber or plant fiber may be used. As the supplement, glass fiber, carbon fiber, polyamide fiber, polyarylate fiber, needle like inorganic, fiber-like fluoroplastic or the like may be used. As the antibacterial agent, silver ion, copper ion, zeolite containing these ions or the like may be used. As the retardant, silicon-based retardant, bromine-based retardant, phosphorus-based retardant, inorganic retardant or the like may be used. As the stabilizer for hydrolysis resistance, carbodiimide-based modifying agent or the like may be used.

[Molded Product]

The molded product according to the present invention is molded using the above-mentioned urethane resin composition, and may be formed by molding and curing an uncured urethane ingredient containing the polylactic acid-based polyol composition, the polyisocyanate compound and the catalyst. Also, a reaction may partially proceed and cross-links are formed in the urethane ingredient to produce a prepolymer and subsequently the prepolymer is molded and cured to form a molded product. In addition, the uncured urethane ingredient or the prepolymer is dissolved in a solvent such as chloroform and subsequently it is casted to form a polyurethane film. The urethane ingredient may be molded using methods such as transfer molding, RIM molding, compression molding, blowing molding, or photo-curing molding at a temperature below the degradation temperature of the polylactic acid-based polyol.

The molded product may be used for electronic, medical, packaging, fiber, paint, adhesive and industrial materials or the like, and is particularly suitable to electronic or medical material. When discarding the molded product, it may easily be biodegraded by sunlight or water, or by entering a biocycle in nature environment without firing.

EXAMPLES

The present invention will be described in detail with reference to the following examples, but these examples are not intended to limit the scope of the present invention. As reagents and others, commercially available high purity products are used in examples.

Example 1

[Production of Polylactic Acid-based Polyol]

To 1 L separable flask, 318 g of polylactic acid (TERRA-MAC: manufactured by UNITAKA LTD.) and 11.0 g of D-sorbitol were added, and dissolved and mixed at 210° C. for 5 h under a nitrogen atmosphere to perform transesterification. Then, a distiller was attached to the separable flask, and oligomers were removed by distillation at 210° C. for 3 h under a reduced pressure (15 mmHg or less). Then, the reaction product was cooled to room temperature to obtain a polylactic acid-based polyol (R1).

[Chem.1]

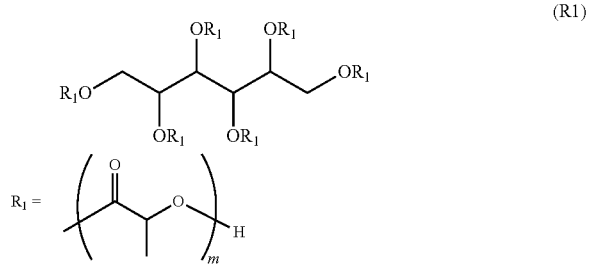

(R1)

[The Number Average Molecular Weight of Polylactic Acid-based Polyol]

The number average molecular weight of the resulting polylactic acid-based polyol was 7098 as calculated from the concentration of OH groups measured by NMR, and 6413 in terms of standard polystyrene as measured by a gel permeation chromatography method.

[The Carboxylic Acid Concentration of Polylactic Acid-based Polyol]

1 g of the resulting polylactic acid-based polyol was dissolved in the mix solution of chloroform (50 mL)/methanol (50 mL), and was titrated with 0.1 N aqueous solution of sodium using Phenol Red as an indicator. The carboxylic acid concentration of the polylactic acid-based polyol was determined as 69.7 µmol/g.

[Production of Polylactic Acid-based Polyol Composition]

10 g of the resulting polylactic acid-based polyol and 0.5 g (5 parts of weight) of a silica compound were heated and mixed at 180° C. for 10 min to obtain a polylactic acid-based polyol composition. To the resulting polylactic acid-based polyol composition, 1.54 g of isocyanate (R2) was added and stirred at 180° C. for 1 min. Then, the reaction product was cooled in air to obtain a urethane resin composition.

[Chem. 2]

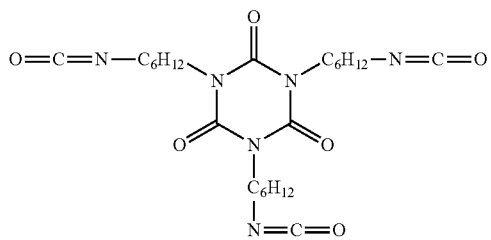

(R2)

[Gellation Time]

The surface temperature of a hot plate was measured by a surface temperature thermometer, and the gellation time of the resulting urethane resin composition was measured in a location where a temperature is 180±1° C. The measured gellation time is shown in Table 1. In Table 1, A indicates that a urethane resin composition is moldable, and B indicates that a urethane resin composition is not moldable.

[Molded Product]

The resulting urethane resin composition was subjected to a press molding at 180° C. for 30 min to form a molded product having the dimension of 2 cm×3.5 cm×1.6 mm.

The resulting molded product was heated by 80° C., and the center portion of the molded product was bended at the angle of 90° and maintained for 5 sec. Then, the molded product was cooled to room temperature. An angle (A1) at this time point was measured, and the shape retention of the molded product was evaluated according to the following criteria. The result is shown in Table 1.

A 80°≤A1≤100°
B 70°≤A1<80° or 100°<A1≤110°
C 0°≤A1<70° or 110°<A1≤180°

This molded product was again heated at 80° C. for 3 min. After heating, an angle (A2) at the bended portion was measured, and the shape restoration of the molded product was evaluated. The result is shown in Table 1.

A 170°≤A2≤180°
B 160°≤A2<170°
C 0°≤A2<160°

Examples 2 to 6

Polylactic acid-based polyol compositions were prepared using the same method as in Example 1 except for using components shown in Table 1. Also, molded products were formed and evaluated using the same method as in Example 1. The results are shown in Table 1.

Comparative Example 1

A Polylactic acid-based polyol composition was prepared using the same method as in Example 1 except for using no silica compound. In this case, the gellation time of urethane ingredient was too short to form a molded product. The result is shown in Table 1.

Comparative Examples 2 and 3

Polylactic acid-based polyol compositions were prepared using the same method as in Example 1 except for using components shown in Table 1. In Comparative Example 2, the gellation time of urethane ingredient was too short to form a molded product. The results are shown in Table 1.

Example 7

[Production of Polylactic Acid-based Polyol]
A polylactic acid-based polyol (R3) was prepared using the same method as in Example 1 except for using 200 g of 4032D (trade name; manufactured by Teijin Limited) as a polylactic acid and 10.0 g of D-sorbitol.

[Chem. 3]

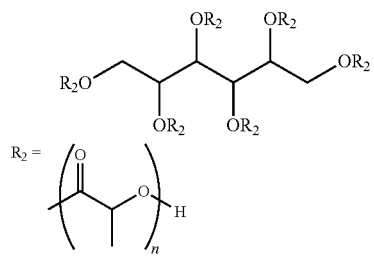

(R3)

[The Number Average Molecular Weight of Polylactic Acid-based Polyol]
The number average molecular weight of the resulting polylactic acid-based polyol was 3642 as calculated from the concentration of OH groups measured by NMR, and 4213 in terms of standard polystyrene as measured by a gel permeation chromatography method.
[The Carboxylic Acid Concentration of Polylactic Acid-based Polyol]
1 g of the resulting polylactic acid-based polyol was dissolved in the mix solution of chloroform (50 mL)/methanol (50 mL), and was titrated with 0.1 N aqueous solution of sodium using Phenol Red as an indicator. The carboxylic acid concentration of the polylactic acid-based polyol was determined as 5.0 μmol/g.

[Production of Polylactic Acid-based Polyol Composition and Others]
A Polylactic acid-based polyol composition was prepared using the same method as in Example 1 except for using the resulting polylactic acid-based polyol (R3) and 3.0 g of isocyanate (R2). Also, a molded product was formed and evaluated using the same method as in Example 1. The result is shown in Table 1.

Examples 8 and 9

Polylactic acid-based polyol compositions were prepared using the same method as in Example 7 except for using components shown in Table 1. Also, molded products were formed and evaluated using the same method as in Example 1. The results are shown in Table 1.

Example 10

[Synthesis of Soft Polyol (Polybutylene Succinate (PBS))]
1170 g of succinic anhydride and 1280 g of 1,4-butanediol were heated at 190° C. for 4 h followed by another 2 h under a reduced pressure to perform dehydrocondensation. The resulting product was dissolved in 2 L of chloroform. Then, the reaction product was poured into excess methanol to reprecipitate, resulting in obtaining polybutylenesuccinate (R4) having hydroxyl groups at its ends. The number average molecular weight of the resulting soft polyol was 1337 as calculated from the concentration of OH groups measured by NMR, and 2300 in terms of standard polystyrene as measured by a gel permeation chromatography method

[Chem. 4]

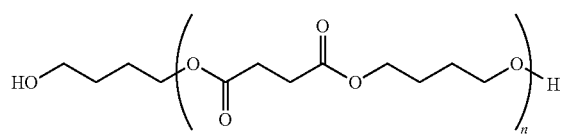

(R4)

9 g of polylactic acid-based polyol (R3), 1 g of polybutylenesuccinate (R4) and 0.5 g (5 parts of weight) of silica compound (AZ-400) were heated and mixed at 180° C. for 10 min to obtain a polylactic acid-based polyol composition. To the resulting polylactic acid-based polyol composition, 3.0 g of isocyanate compound (R2) was added and stirred at 180° C. for 1 min. Then, the reaction product was cooled in air to obtain a urethane resin composition.

Comparative Example 4

A Polylactic acid-based polyol composition was prepared using the same method as in Example 7 except for using no silica compound. In this case, the gellation time of the resulting urethane composition was too short to form a molded product. The result is shown in Table 1.

TABLE 1

| | | Polylactic acid-based | | Amount Silica | | Surface area | Gellation time @180° C. | Shape memory property | |
|---|---|---|---|---|---|---|---|---|---|
| | | Polyol | Silica | (wt %) | (phr) | (m²) | (A: 90 s~) | Retention | Restoration |
| Example 1 | A reduced pressure method + silica | R1 | AZ-400 | 5 | 5 | 1500 | A(218 s) | A | A |
| Example 2 | | | AZ-400 | 2 | 2 | 600 | A(233 s) | A | A |
| Example 3 | | | AZ-400 | 1 | 1 | 300 | A(203 s) | A | A |

TABLE 1-continued

| | Polylactic acid-based Polyol | Silica | Amount Silica (wt %) | (phr) | Surface area (m²) | Gellation time @180° C. (A: 90 s~) | Shape memory property Retention | Restoration |
|---|---|---|---|---|---|---|---|---|
| Example 4 | | AEROSIL 200 | 1 | 1 | 200 | A(154 s) | A | A |
| Example 5 | | AZ-400 | 0.5 | 0.5 | 150 | A(166 s) | A | A |
| Example 6 | | AZ-400 | 0.27 | 0.27 | 81 | A(143 s) | A | A |
| Example 7 | R3 | AZ-400 | 5 | 5 | 1500 | A(1263 s) | A | A |
| Example 8 | | BY-601 | 5 | 5 | 2250 | A(1000 s) | A | A |
| Example 9 | | AZ-400 | 10 | 9.1 | 2730 | A(785 s) | A | A |
| Example 10 | R3 90 wt % PBS polyol 10 wt % | AZ-400 | 5 | 5 | 1500 | A(848 s) | A | A |
| Comp. Example 1 | Only a reduced pressure method | R1 | — | — | — | A(28 s) | Not moldable | |
| Comp. Example 2 | A reduced pressure method + silica | | FB-3SDC | 1 | 1 | 3.4 | A(36 s) | Not moldable |
| Comp. Example 3 | | AZ-400 | 80 | 400 | 120000 | A(230 s) | C | |
| Comp. Example 4 | Only a reduced pressure method | R3 | — | — | — | A(8 s) | Not moldable | |

In Table 1, the trade names indicate the following products.

AZ-400: Silica compound (manufactured by Tosoh Silica Corporation), BET specific surface area 300 m²/g, particle size 3.0 μm AEROSIL200: Silica compound (manufactured by Nippon Aerosil Co., Ltd.), BET specific surface area 200 m²/g, particle size 12 nm BY-601: Silica compound (manufactured by Tosoh Silica Corporation), BET specific surface area 450 m²/g, particle size 5.0 μm FB-3SDC: Silica compound (manufactured by Denki Kagaku Kogyo K.K.), BET specific surface area 3.4 m²/g, particle size 3.4 μm From the results of Examples 1 to 9, it is demonstrated that polylactic acid-based polyol compositions, which are prepared by purifying a polylactic acid-based polyol obtained by transesterification by reducing pressure and adding at an amount of 70 wt % or less a silica compound having a surface area of 40 m² or more based on 100 g of the polylactic acid-based polyol, can produce urethane resin compositions having gellation time (90 s or more) which allows a molding, and the resulting molded products have shape memory property. From Example 10, it is demonstrated that when a polylactic acid-based polyol composition with a soft polyol is used, an effect of adsorbing a polymerization catalyst contained in the polylactic acid-based polyol composition can be achieved. To the contrary, from Comparative Examples 1 and 4, it is demonstrated that the gellation time of urethane resin compositions is too short to form a molded product even when polylactic acid-based polyols purified by a reducing pressure are used. From Comparative Example 2, it is demonstrated that silica compounds with small surface areas cannot achieve a complete adsorption of polymerization catalyst contained in the polylactic acid-based polyol composition, and the gellation time of urethane resin compositions is shorter and it is not possible to form a molded product. From Comparative Example 3, it is demonstrated that when the amount of silica compound added is large, an effect of adsorbing a polymerization catalyst contained in the polylactic acid-based polyol can be achieved, but the resulting molded product has high modulus, and it is difficult to deform the molded product, resulting in losing shape memory property.

Example 11

5.25 g of polylactic acid-based polyol (R3) was melted at 180° C., 0.016 g of dibutyltin dilaurate was added and stirred for 1 min. Then, the reaction product was cooled in air and ground. The ground matter was used as a master batch (R5).

7.20 g of polylactic acid-based polyol (R3) and 0.4 g of silica compound (AZ-400) were heated and mixed and thereafter 0.08 g of the master batch (R5) was added and stirred at 180° C. for 1 min to obtain a polylactic acid-based polyol composition containing 0.03 wt % of dibutyltin dilaurate. To the polylactic acid-based polyol composition, 2.40 g of isocyanate compound (R2) was added and stirred to produce a urethane resin composition. Using this composition, a molded produce was formed and evaluated using the same method as in Example 1. The gellation time of this urethane resin composition was 171 sec, and the molded product had good shape memory property in both of retention and restoration.

Example 12

A polylactic acid-based polyol composition was prepared using the same method as in Example 11 except that the polylactic acid-based polyol (R3) and the master batch (R5) were used at the amounts of 6.93 g and 1.07 g and the content of dibutyltin dilaurate in the polylactic acid-based polyol composition was 0.04 wt %. Also, a urethane resin composition and a molded product were prepared using the same method as in Example 11. The gellation time of the resulting urethane resin composition was 153 sec, and the molded product had good shape memory property in both of retention and restoration.

Comparative Example 5

10 g (100 parts) of polylactic acid-based polyol (R1) was melted at 180° C., 0.5 g (5 parts) of silica compound (AZ-400) and the isocyanate compound (R2) were simultaneously added, and the resulting mixture was stirred at 180° C. for 1 min. Then, the reaction product was cooled in air to obtain a prepolymer. The gellation time of the prepolymer was 10 sec at 180° C., and thus it was not moldable.

TABLE 2

|  | Example 7 | Example 11 | Example 12 | Comparative Example 5 |
|---|---|---|---|---|
| Amount of catalyst added (wt %) | 0 | 0.03 | 0.04 | 0 |
| Gellation time(s) @180° C. | 1263 | 171 | 153 | 10 |

Examples 11 and 12 demonstrates that when the silica compound was used at 5 parts, the gellation time of the urethane resin compositions was shortened by adding the catalyst for urethane formation during urethane formation, and the gellation time may be adjusted by the amounts of catalyst used. To the contrary, Comparative Example 5 demonstrates that the silica compound was used at 5 parts, but the gellation time of the urethane resin composition was uncontrollably and dramatically shortened due to adding simultaneously the silica compound and isocyanate to the polylactic acid-based polyol, and a catalyst-adsorbing effect by the silica compound cannot be obtained. It is believed that the urethane reaction is promoted before the catalyst is adsorbed on the silica compound. Therefore, it is necessary that the silica compound is previously added to the polylactic acid-based polyol to adsorb the remaining catalyst.

From these results, it is demonstrated that if a silica compound having a surface area of 40 m$^2$ or more per 100 g is added to a polylactic acid-based polyol composition, a urethane reaction can be controlled even when polylactic acid-based polyol in which a polymerization catalyst remains is used.

Industrial Applicability

The polylactic acid-based polyol composition according to the present invention can be simply obtained by adding a silica compound having a particular surface area to a polylactic acid-based polyol obtained by transesterification, wherein a catalytic function in urethane formation of a polymerization catalyst which is used in the synthesis of a polylactic acid-based compound and remains in the polylactic acid-based polyol is deactivated. Also, since the silica compound dose not degrade the polylactic acid-based compound, a urethane resin composition obtained using the polylactic acid-based polyol composition according to the present invention can form a molded product having excellent properties. Therefore, the molded product formed using the urethane resin composition according to the present invention can be used in a wide range of fields including electronic, medical, packaging, fiber, paint, adhesive, industrial materials, or the like. The molded product is particularly suitable to medical materials due to its biodegradability. Also, this product has shape memory property, and thus it can be used in a sheath material for personal computers and mobile phones, a roller for screws, clamping pins, switches, sensors, information recording devices, OA devices or the like, parts for belts or the like, a packing material for sockets, palette or the like, an open and dose valve for cooling and heating air-conditioners, a thermal contraction tube, or the like. In addition, it is applicable for various fields including automobile parts such as bumper, handle or side mirror, household parts such as plaster cast, toys, glass frame, hearing aid, dental wire, dislocation-preventing bedding, or the like.

The invention claimed is:

1. A polylactic acid-based polyol composition comprising a polylactic acid-based polyol obtained by transesterification, a silica compound and a soft polyol having glass transition temperature (Tg) of less than 30° C., wherein the silica compound has a surface area of 40 m$^2$ or more based on 100 g of said polylactic acid-based polyol, and a content of the silica compound is 70 wt % or less.

2. The polylactic acid-based polyol composition of claim 1, wherein the average primary particle size of the silica compound is 30 μm or less.

3. The polylactic acid-based polyol composition of claim 1, wherein the silica compound has hydrophilic nature on its surface.

4. The polylactic acid-based polyol composition of-claim 1, wherein the average secondary particle size of the silica compound is not less than 0.05 μm and not more than 30 μm.

5. A urethane resin composition comprising a urethane ingredient including a polylactic acid-based polyol composition according to claim 1 and a polyisocyanate compound.

6. The urethane resin composition of claim 5, wherein the urethane resin composition has a tin catalyst added.

7. The urethane resin composition of claim 6, wherein the tin catalyst is dibutyltin dilaurate.

8. A process for the production of a polylactic acid-based polyol composition comprising adding a silica compound and a soft polyol having glass transition temperature (Tg) of less than 30° C. to a crude polylactic acid-based polyol which is obtained by transesterilication between a polylactic acid-based compound synthesized by using a catalyst and a polyol, wherein the silica compound has a surface area of 40m$^2$ or more based on 100 g of said crude polylactic acid-based polyol, and a content of the silica compound is 70 wt% or less.

9. The process for the production of a polylactic acid-based polyol composition of claim 8, wherein the crude polylactic acid-based polyol is treated under a reduced pressure to remove volatile oligomers.

10. The process for the production of a polylactic acid-based polyol composition of claim 8, wherein the silica compound is added by heating and mixing at a temperature in the range of 130° C. to 230° C. for 1 min to 1 h.

11. A process for the production of a urethane resin composition comprising adding a catalyst when adding a polyisocyanate compound to a polylactic acid-based polyol composition according to claim 1.

12. A molded product which is formed using a urethane resin composition according to claim 5.

* * * * *